United States Patent
Ko

(10) Patent No.: US 7,782,799 B2
(45) Date of Patent: Aug. 24, 2010

(54) JOIN MESSAGE LOAD CONTROL SYSTEM AND METHOD IN NETWORK USING PIM-SSM

(75) Inventor: Eun-Sook Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 12/068,462

(22) Filed: Feb. 6, 2008

(65) Prior Publication Data

US 2009/0067426 A1 Mar. 12, 2009

(30) Foreign Application Priority Data

Feb. 9, 2007 (KR) .................. 10-2007-0013926

(51) Int. Cl.
*H04L 12/28* (2006.01)
*H04L 12/56* (2006.01)
*H04J 3/26* (2006.01)
*G06F 15/16* (2006.01)

(52) U.S. Cl. .................. 370/256; 370/390; 370/408; 370/432; 709/252

(58) Field of Classification Search .......... 370/390, 370/256, 409, 432; 709/252
See application file for complete search history.

(56) References Cited

U.S. PATENT DOCUMENTS

| | | | |
|---|---|---|---|
| 6,611,872 B1* | 8/2003 | McCanne | 709/238 |
| 7,418,003 B1* | 8/2008 | Alvarez et al. | 370/432 |
| 2002/0150094 A1* | 10/2002 | Cheng et al. | 370/389 |
| 2007/0011350 A1* | 1/2007 | Lu et al. | 709/238 |
| 2007/0214246 A1* | 9/2007 | Venkataswami et al. | 709/223 |
| 2008/0002591 A1* | 1/2008 | Ueno | 370/244 |

* cited by examiner

*Primary Examiner*—Alpus H Hsu
*Assistant Examiner*—Saad Hassan
(74) *Attorney, Agent, or Firm*—H.C. Park & Associates, PLC

(57) ABSTRACT

A Join message load control system in a network using a Protocol Independent Multicast-Source Specific Multicast (PIM-SSM) protocol, the Join message load control system including a source access hop router creating a SOURCE-INACTIVE message and transmitting the created SOURCE-INACTIVE message when a multicast traffic is not received from the multicast server during a set Keep-Alive Time (KAT), and the SOURCE-INACTIVE message including information on an update set time of a PIM Join message; and a group access hop router resetting the update set time of the PIM Join message when the SOURCE-INACTIVE message is received from the source access hop router. Accordingly, it is possible to reduce the periodical transmission of unnecessary Join(S, G) messages and thereby reduce traffic load in a network by adjusting a JP timer of the Join(S, G) message depending on whether a channel(S, G) is active or inactive.

36 Claims, 10 Drawing Sheets

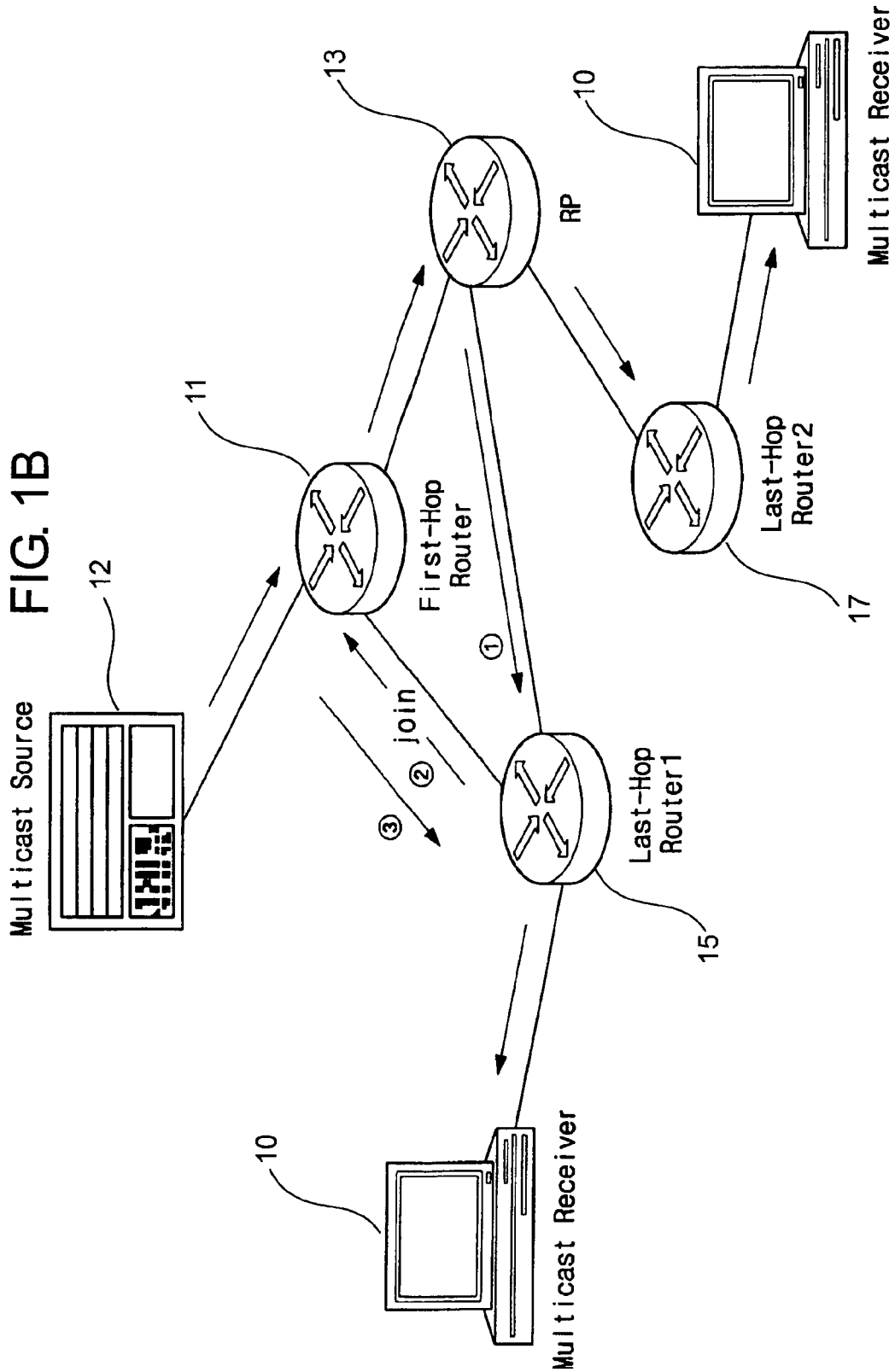

FIG. 5A

```
 0                   1                   2                   3
 0 1 2 3 4 5 6 7 8 9 0 1 2 3 4 5 6 7 8 9 0 1 2 3 4 5 6 7 8 9 0 1  (Bit)
+-+-+-+-+-+-+-+-+-+-+-+-+-+-+-+-+-+-+-+-+-+-+-+-+-+-+-+-+-+-+-+-+
| PIM Ver | Type  |   Reserved    |           Checksum            |
+-+-+-+-+-+-+-+-+-+-+-+-+-+-+-+-+-+-+-+-+-+-+-+-+-+-+-+-+-+-+-+-+
```

FIG. 5B

| | Message Type | Destination |
|---|---|---|
| 0 | Hello | Multicast to ALL-PIM-ROUTERS |
| 1 | Register | Unicast to RP |
| 2 | Register-Stop | Unicast to source of Register packet |
| 3 | Join/Prune | Multicast to ALL-PIM-ROUTERS |
| 4 | Bootstrap | Multicast to ALL-PIM-ROUTERS |
| 5 | Assert | Multicast to ALL-PIM-ROUTERS |
| 6 | Graft (used in PIM-DM only) | Unicast to RPF'(S) |
| 7 | Graft-Ack (used in PIM-DM only) | Unicast to source of Graft packet |
| 8 | Candidate-RP-Advertisement | Unicast to Domain's BSR |
| 9~15 | Not Defined | |

[SOURCE-INACTIVE Message Format]

[Encoded-Source format]

[Encoded-Group format]

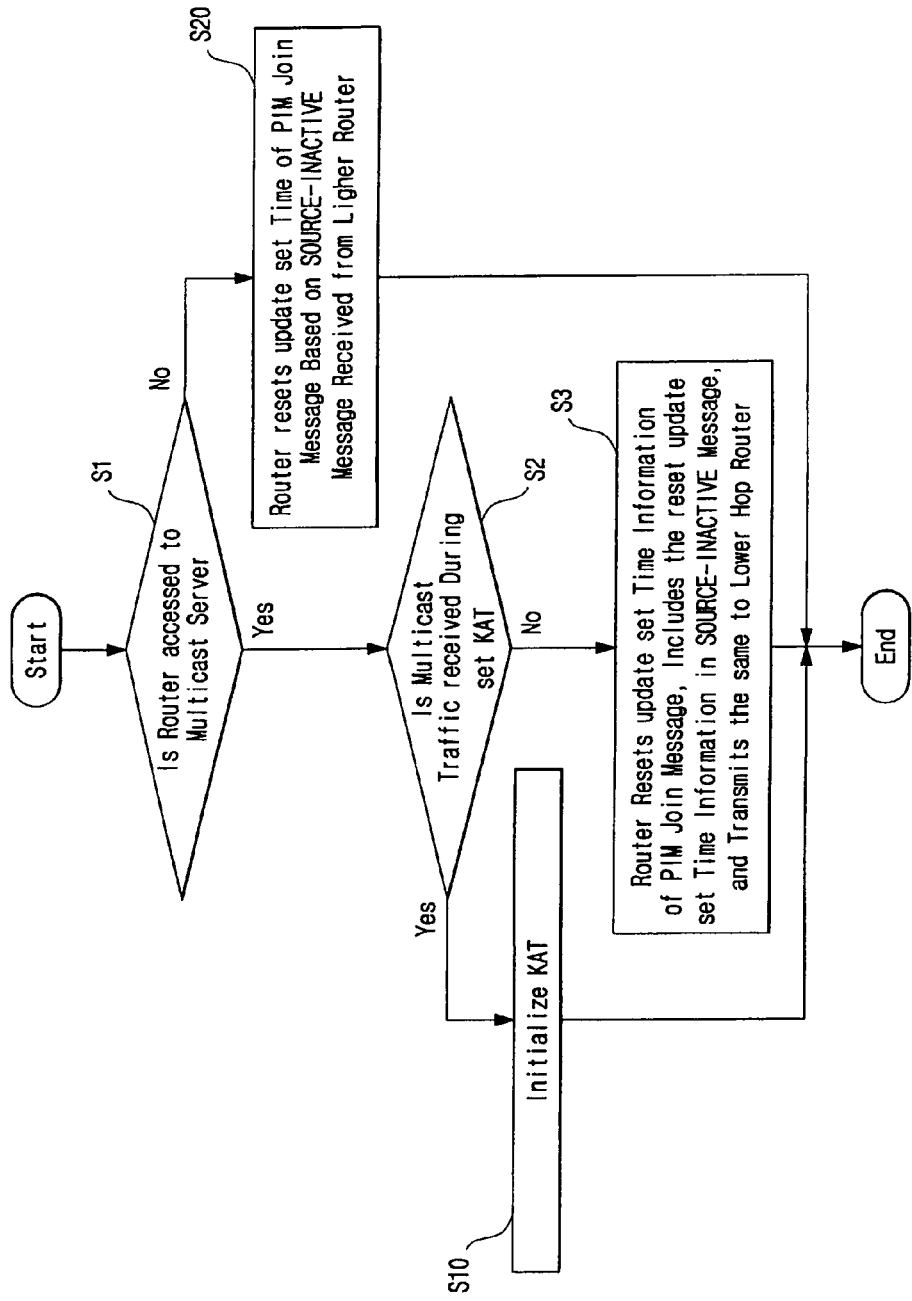

JOIN MESSAGE LOAD CONTROL SYSTEM AND METHOD IN NETWORK USING PIM-SSM

CLAIM OF PRIORITY

This application makes reference to, incorporates the same herein, and claims all benefits accruing under 35 U.S.C. §119 from an application for JOIN MESSAGE LOAD CONTROL SYSTEM AND METHOD IN NETWORK USING PIM-SSM, earlier filed in the Korean Intellectual Property Office on 9 Feb. 2007 and there duly assigned Serial No. 2007-0013926.

BACKGROUND OF THE INVENTION

1. Field of the Invention

The present invention relates to a Join message load control system and method in a network using a Protocol Independent Multicast-Source Specific Multicast (PIM-SSM), and more particularly, to a Join message load control system and method in a network using a PIM-SSM, which may be dynamically aware of whether a channel is active or inactive and may also reduce transmission of an unnecessary packet in a network.

2. Description of the Related Art

Recently, a great amount of broadcast traffic exists in networks all over the world. The same traffic may be transferred as a unicast to a plurality of receivers.

In a network using the unicast, when a data packet such as broadcast traffic must be transmitted to a plurality of receivers, same packet must be transmitted in duplicate. Therefore, the deterioration of the efficiency of the entire network may be caused.

Meanwhile, in such environments, a multicast clones the broadcast traffic and transfers the cloned broadcast traffic to the plurality of receivers. Therefore, it is possible to prevent duplicated unicast traffic from being unnecessarily transmitted and reduce consumption of network sources.

For example, in the case of a company broadcast that all the employees in the company need to view and listen to every day and at the same time, if the company broadcast is a unicast, broadcast traffic must be transmitted in duplicate to the respective personal computers (PCs) of the employees.

When the company broadcast is a multicast, however, a multicast server transmits the broadcast traffic only once and intermediate multicast routers clone the received broadcast traffic and transmit the cloned broadcast traffic to lower routers.

Examples of a scheme that uses the multicast include a Protocol Independent Multicast-Sparse Mode (PIM-SM) and a Protocol Independent Multicast-Source Specific Multicast (PIM-SSM).

In this instance, the Protocol Independent Multicast-Sparse Mode (PIM-SM) functions to transmit a multicast packet to a multicast group and effectively operate in a Wide Area Network (WAN) environment.

Irrespective of what type of unicast routing protocol is being used, such as Border Gateway Protocol (BGP), an Open Shortest Path First (OSPF) protocol, a Routing Information Protocol (RIP), and the like, the Protocol Independent Multicast-Sparse Mode (PIM-SM) uses existing unicast routing information and thus is referred to as "Protocol-Independent".

On the other hand, a multicast protocol such as a distance vector multicast routing protocol constructs unicast routing information by itself.

Since the Protocol Independent Multicast-Sparse Mode (PIM-SM) is a protocol designed for multicast groups that exist in the extensive scope of regions, the Protocol Independent Multicast-Sparse Mode (PIM-SM) may be more effectively operated in the Wide Area Network (WAN) environment.

The Protocol Independent Multicast-Sparse Mode (PIM-SM) supports a shared-tree and a source-based tree, that is, a shortest-path tree.

When the Protocol Independent Multicast-Sparse Mode (PIM-SM) supports the shared-tree, a central router, that is, a rendezvous point (RP), is used as a root of the shared tree and a first hop router that is directly connected to a multicast source transmits a received multicast traffic to rendezvous point (RP). Last-Hop Routers are directly connected to multicast receivers. Next, rendezvous point (RP) transfers the multicast traffic to all of multicast receivers that are included in a corresponding multicast group through the shared-tree. For this operation, all of multicast receivers enroll at the Internet Protocol (IP) multicast group information that multicast receivers desires to receive. Therefore, traffic from multicast source comes down to Rendezvous point (RP) through First-Hop Router and Rendezvous point (RP) transmits the traffic to multicast receivers through Last-Hop Routers.

When the Protocol Independent Multicast-Sparse Mode (PIM-SM) supports the source-based tree, on the other hand, a source tree exists for each multicast source. A last-hop router that is connected to multicast receiver finds a shortest path heading toward a corresponding multicast source and multicast source joins a multicast group whereby the multicast traffic is transferred to each multicast receiver via the source tree.

The two schemes described above initially transfer the multicast traffic via the shared-tree and convert to the source tree at the last-hop router when the multicast traffic is transferred to the multicast receiver.

The Protocol Independent Multicast-Source Specific Multicast (PIM-SSM) always uses the source tree, instead of using the shared tree, based on the above-described Protocol Independent Multicast-Sparse Mode (PIM-SM). In the Protocol Independent Multicast-Sparse Mode (PIM-SM) scheme, multicast receivers are aware of information on the multicast source (i.e., the multicast server) and information on the multicast group that the multicast receiver desires to join. The multicast receiver operates in such a manner to join the multicast source and multicast group information at the router.

Also, with respect to a particular multicast source and a particular multicast group, the Protocol Independent Multicast-Source Specific Multicast (PIM-SSM) transfers the multicast traffic only to a joined multicast receiver. Specifically, when it is assumed that the multicast source that the receiver desires to join is 'S' and an address of the multicast group is 'G', the receiver joins (S, G), which is referred to as a channel (S, G).

The multicast traffic of the PIM-SSM is transferred only through the channel(S, G).

In order for the multicast receiver to join the channel(S, G), Internet Group Management Protocol Version 3 (IGMPv3) must be supported.

Instead of the Protocol Independent Multicast-Source Specific Multicast (PIM-SSM) initially transferring the multicast traffic through the shared-tree and subsequently converting to the source-based tree, multicast receivers are already aware of the multicast source and then joins the channel(S, G). Therefore, the concept of the shared tree is not needed. Accordingly, the Protocol Independent Multicast-Source Specific Multicast (PIM-SSM) uses only the source-based tree, that is, the shortest-path tree, without using the shared-tree and the Rendezvous point (RP).

When a multicast receiver joins a channel(S, G) and transmits a 'Join' message to a first router (i.e., a last-hop router) at the first step, and the last-hop router receives a 'Join' message from the multicast receiver and must periodically, for example, at a default time interval of 60 seconds, transmit a Protocol Independent Multicast-Sparse Mode (PIM-SM) Join message(S, G) to a second router (i.e., a first-hop router) heading toward multicast source S at the second. Next, the higher level router receives the Join message(S, G) from the lower level router (i.e., last-hop router) and also periodically transmits the Join message(S, G) to a third router, that is, another higher router heading toward the multicast source S at the third step.

When using the Protocol Independent Multicast-Source Specific Multicast (PIM-SSM), different applications may use different multicast source addresses for multicast group addresses, respectively.

On the other hand, when using the Protocol Independent Multicast-Sparse Mode (PIM-SM), different applications use the same multicast group address. Therefore, the applications may receive undesired multicast traffic.

When a multicast receiver joins a channel(S, G) and transmits a 'Join' message to a first router (i.e., a last-hop router), and the last-hop router receives a 'Join' message from the multicast receiver and must periodically, for example, at a default time interval of 60 seconds, transmit a Protocol Independent Multicast-Sparse Mode (PIM-SM) Join message(S, G) to a second router (i.e., a higher level router) heading toward a multicast source S.

Next, the higher level router receives the Join message(S, G) from the lower level router (i.e., last hop router) and also periodically transmits the Join message(S, G) to a third router, that is, another higher router heading toward the multicast source S.

Through the above process of joining the channel(S, G), the first, the second, and the third routers in the network may create and maintain the channel(S, G).

In this instance, the third router that is a first-router heading toward the multicast source may receive the multicast traffic from the multicast source S and immediately transfer the multicast traffic to a lower router through the created channel (S, G).

When the third router receives the multicast traffic(S, G) from the multicast source S, the third router starts a Keep-Alive Time (KAT) timer. The KAT timer is used to delete the channel(S, G) when the multicast traffic(S, G) is initially received from the multicast source S and another multicast traffic(S, G) is not received from the multicast source S during a predetermined period of time.

Even though the multicast traffic(S, G) is not received from the multicast source S, when a (S, G) Protocol Independent Multicast (PIM) Join message is received from a lower hop router, the KAT timer does not delete the channel(S, G). Only when the (S, G) Protocol Independent Multicast (PIM) Join message is not received from the lower hop router, the KAT timer is used to delete the corresponding channel(S, G).

The contemporary Protocol Independent Multicast-Source Specific Multicast (PIM-SSM), however, does not have a function for informing the multicast receiver side about whether a multicast source is active or inactive. Therefore, a multicast receiver cannot be aware of whether the multicast source is active or inactive.

Accordingly, even though the channel(S, G) is not active anymore, that is, even though the multicast source S does not transmit the multicast traffic to the multicast group G for a long time period, or even though the multicast source S does not transmit the multicast traffic to the multicast group G anymore, in a state where the multicast receiver joins the channel(S, G), the last-hop router must periodically, for example, once every 60 seconds, transmit a Join message(S, G) to a higher hop router. Also, a router connected to the multicast source and all of the intermediate routers must periodically transmit Join messages(S, G) which requires transmission of an unnecessary packet be transmitted, and thereby causes a heavy traffic load in a network. Therefore, it is preferable that in a heavily loaded wireless communication system, any unnecessary packet transmission is either eliminated or reduced. Transmission of 'Join' messages for routers joining desired channels and for multicast receivers joining desired channels is one part of the entire packet of a transmission in the wireless communication system. Moreover, any unnecessary packet load should be reduced as much as possible in any communication system. Therefore, either eliminating or reducing the transmissions of 'Join' messages is one desirable way to prevent an unnecessary traffic load from being added to the wireless communication system, and for thus improving the efficiency of the communication system.

SUMMARY OF THE INVENTION

It is, therefore, an object of the present invention to provide an improved Join message load control system and method in a communication system to overcome the above stated problems.

It is another object of the present invention to provide a Join message load control system and method in a network using a Protocol Independent Multicast-Source Specific Multicast (PIM-SSM), which can be dynamically aware of whether a channel(S, G) is either active or inactive and can also reduce the transmission of an unnecessary packet in a network.

It is still another object of the present invention to provide a Join message load control system and method in a network using a PIM-SSM, which can inform a lower router of whether a channel(S, G) is active or inactive using a new message, control a period of a Join message(S, G) to be transmitted to a higher router and thereby may reduce the transmission of an unnecessary packet. This effort is in order to supplement insufficient functions of a contemporary PIM-SSM.

It is again another object of the present invention to provide a Join message load control system and method in a network using a Protocol Independent Multicast-Source Specific Multicast (PIM-SSM), in which an improved PIM-SSM protocol constructed according to the present invention can control a Join message(S, G) to not be periodically transmitted to a multicast source that does not transmit a multicast traffic for a long period of time or at all in a network.

According to an aspect of the present invention, there is provided a Join message load control system in a network using a Protocol Independent Multicast-Source Specific Multicast (PIM-SSM), the system including a source access hop router for creating a source-inactive message and transmit the created SOURCE-INACTIVE message when a multicast traffic is not received from the multicast server during a set Keep-Alive Time (KAT), and the SOURCE-INACTIVE message includes information on a update set time of a Protocol Independent Multicast (PIM) Join message; and a group access hop router for resetting the update set time of the Protocol Independent Multicast (PIM) Join message when the SOURCE-INACTIVE message is received from the source access hop router.

The source access hop router may be a router that is directly connected to the multicast server. Also, the source access hop router may be a router that is directly connected to the multicast server.

Also, when the multicast traffic is not received from the multicast server, and the Protocol Independent Multicast (PIM) Join message is not received, the source access hop router may set an Extended Play time (EP time) for receipt of the Protocol Independent Multicast (PIM) Join message to delete a channel(S, G). Also, the source access hop router may change the update set time information of the Protocol Independent Multicast (PIM) Join message and include the changed update set time information of the Protocol Independent Multicast (PIM) Join message in the SOURCE-INACTIVE message.

Also, the source access hop router may increase the update set time of the Protocol Independent Multicast (PIM) Join message, included in the SOURCE-INACTIVE message, to be greater than a currently set update set time of the Protocol Independent Multicast (PIM) Join message.

Here, the SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM). Also, the SOURCE-INACTIVE message may include a Protocol Independent Multicast-Sparse Mode (PIM-SM) message header, update set time information of the Protocol Independent Multicast (PIM) Join message, the multicast server address information, and the multicast group address information.

The SOURCE-INACTIVE message may further include a plurality of items of inactive multicast server information and a plurality of items of multicast group information.

Also, the source access hop router may initialize the KAT when the multicast traffic is received from the multicast server.

Also, when transmitting a corresponding Protocol Independent Multicast (PIM) Join message to the source access hop router after receiving an Internet Group Management Protocol (IGMP) report from the at least one multicast terminal, the group access hop router may transmit the Protocol Independent Multicast (PIM) Join message to the source access hop router at the reset update set time of the Protocol Independent Multicast (PIM) Join message. Also, the group access hop router may initialize the update set time of the Protocol Independent Multicast (PIM) Join message when the multicast traffic is received from the source access hop router.

According to another aspect of the present invention, there is provided a router that can control traffic load in a network using a Protocol Independent Multicast-Source Specific Multicast (PIM-SSM), the router including a status determiner to determine whether the router has accessed the at least one multicast terminal or the multicast server; a traffic determiner to determine whether a multicast traffic is received from the multicast server during a set KAT, when it is determined by the status determiner that the router has accessed the multicast server; and a message processor to reset update set time information of a Protocol Independent Multicast (PIM) Join message, include the reset update set time information of the Protocol Independent Multicast (PIM) Join message in a SOURCE-INACTIVE message, and transmit the same to a lower hop router, when the multicast traffic is not received from the multicast server during the KAT.

The router may further include an EP time adjuster to set an EP time for receipt of the Protocol Independent Multicast (PIM) Join message to delete a channel(S, G) when the multicast traffic is not received from the multicast server and the Protocol Independent Multicast (PIM) Join message is not received.

The message processor may increase the update set time of the Protocol Independent Multicast (PIM) Join message, included in the SOURCE-INACTIVE message, to be greater than a currently set update set time of the Protocol Independent Multicast (PIM) Join message.

Here, the SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM).

Also, the SOURCE-INACTIVE message may include a Protocol Independent Multicast-Sparse Mode (PIM-SM) message header, update set time information of the Protocol Independent Multicast (PIM) Join message, the multicast server address information, and the multicast group address information may also further include a plurality of inactive multicast server information and a plurality of multicast group information.

Also, the router may initialize the KAT when the multicast traffic is received from the multicast server.

Also, the router may further include a message update processor to reset the update set time of the Protocol Independent Multicast (PIM) Join message, included in the SOURCE-INACTIVE message, when it is determined by the status determiner that the router has accessed the at least one multicast terminal and the SOURCE-INACTIVE message is received from a higher router.

Also, the message update processor may transmit the Protocol Independent Multicast (PIM) Join message to the higher router at the set update set time of the Protocol Independent Multicast (PIM) Join message. Also, the message update processor may initialize the update set time of the Protocol Independent Multicast (PIM) Join message when the multicast traffic is received from the higher router.

According to still another aspect of the present invention, there is provided a Join message load control method in a network using a Protocol Independent Multicast-Source Specific Multicast (PIM-SSM), the method including the steps of determining, by the router, whether the router has accessed the at least one multicast terminal or the multicast server; determining, by the router, whether a multicast traffic is received from the multicast server during a set KAT, when it is determined that the router has accessed the multicast server; and resetting update set time information of a Protocol Independent Multicast (PIM) Join message, including the reset update set time information of the Protocol Independent Multicast (PIM) Join message in a SOURCE-INACTIVE message, and transmitting the same to a lower hop router when the multicast traffic is not received from the multicast server during the KAT.

The transmitting step may further include the step of setting an EP time for receipt of the Protocol Independent Multicast (PIM) Join message to delete a channel(S, G) when the multicast traffic is not received from the multicast server, and the Protocol Independent Multicast (PIM) Join message is not received.

Also, the transmitting may increase the update set time of the Protocol Independent Multicast (PIM) Join message, included in the SOURCE-INACTIVE message, to be greater than a currently set update set time of the Protocol Independent Multicast (PIM) Join message.

Here, the SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM).

Also, the SOURCE-INACTIVE message may include a Protocol Independent Multicast-Sparse Mode (PIM-SM) message header, update set time information of the Protocol Independent Multicast (PIM) Join message, the multicast server address information, and the multicast group address information, and may further include a plurality of items of inactive multicast server information and a plurality of items of multicast group information.

A Protocol Independent Multicast (PIM) Join message processing scheme at the router may initialize the KAT when the multicast traffic is received from the multicast server.

The method may further include the step of resetting, by the router, the update set time of the Protocol Independent Multicast (PIM) Join message, based on the SOURCE-INACTIVE message when it is determined that the router has accessed the at least one multicast terminal, and the SOURCE-INACTIVE message is received from a higher router.

Also, the resetting of the update set time may transmit the Protocol Independent Multicast (PIM) Join message to the higher router at the reset update set time of the Protocol Independent Multicast (PIM) Join message.

Also, the Protocol Independent Multicast (PIM) Join message processing scheme at the router may initialize the update set time of the Protocol Independent Multicast (PIM) Join message when the multicast traffic is received from the higher router.

Additional aspects, features, and/or advantages of the invention will be set forth in part in the description which follows and, in part, will be apparent from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1B is a diagram illustrating a transmission of traffic in a network system using a source-based scheme of a Protocol Independent Multicast-Sparse Mode (PIM-SM) constructed according to a contemporary art;

FIG. 5A illustrates a header format of a Protocol Independent Multicast-Sparse Mode (PIM-SM) that is used in the Join message load control system in the network using the Protocol Independent Multicast-Source Specific Multicast (PIM-SSM) as shown in FIG. 3;

FIG. 5B is a table illustrating a message type of the Protocol Independent Multicast-Sparse Mode (PIM-SM) that is used in the Join message load control system in the network using the Protocol Independent Multicast-Source Specific Multicast (PIM-SSM) as shown in FIG. 3;

FIG. 7 is a flowchart illustrating a Join message load control method in a network using a Protocol Independent Multicast-Source Specific Multicast (PIM-SSM) constructed according to an embodiment of the present invention.

DETAILED DESCRIPTION OF THE INVENTION

Figure 1A:
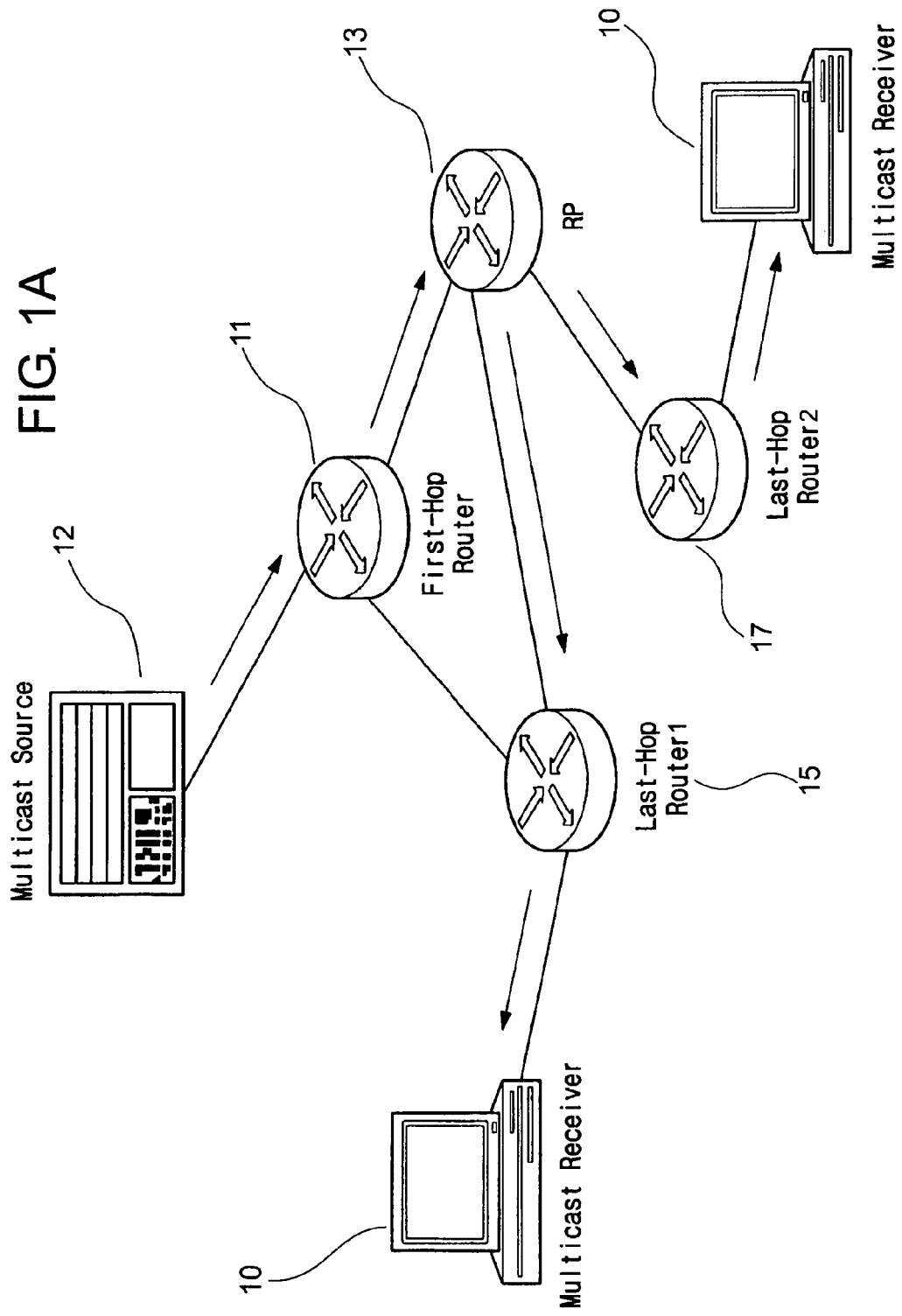
FIG. 1A is a diagram illustrating a transmission of traffic in a network system using a shared-tree scheme of a Protocol Independent Multicast-Sparse Mode (PIM-SM) constructed according to a contemporary art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1C:
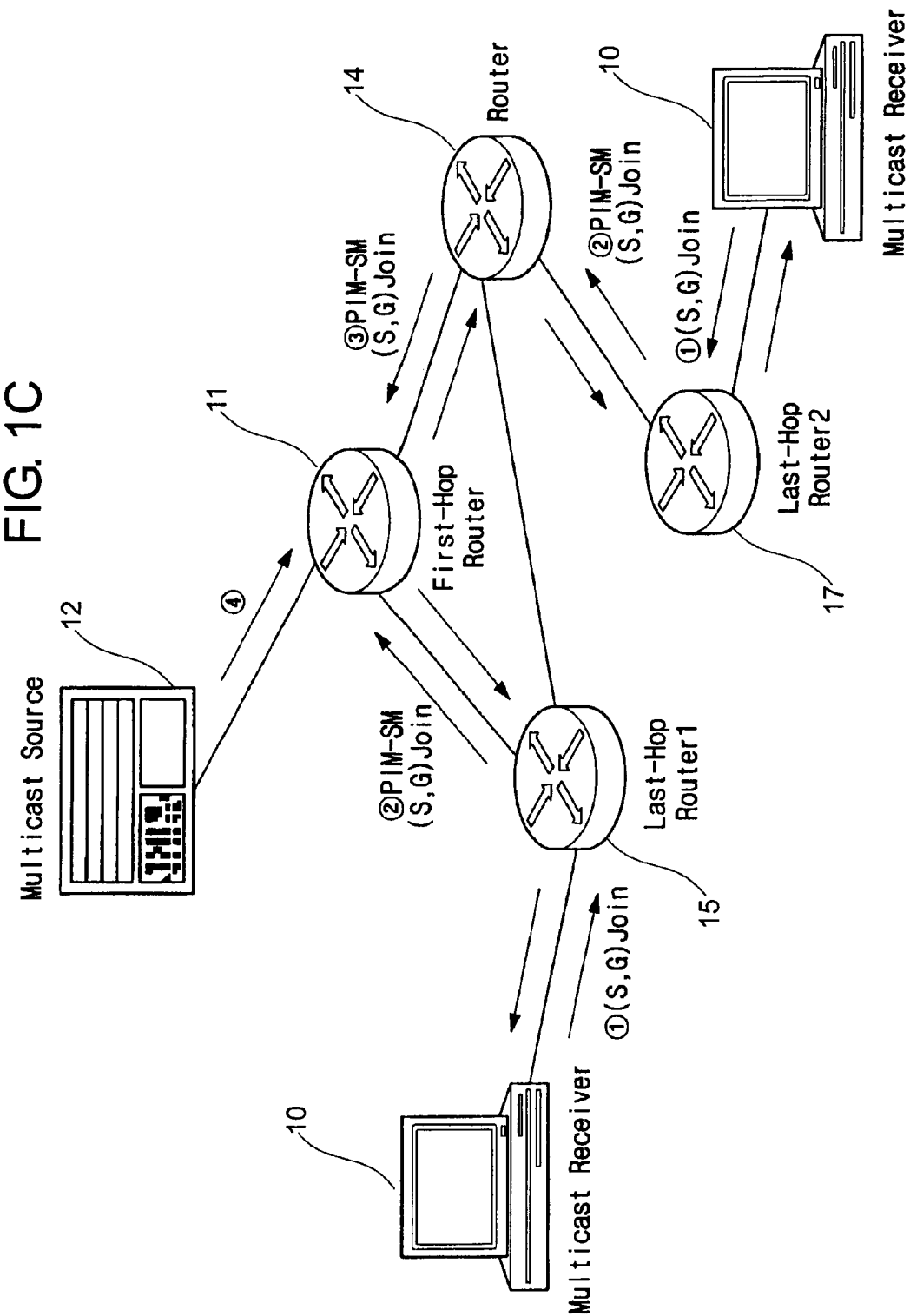
FIG. 1C is a diagram illustrating a transmission of traffic in a network system using a Protocol Independent Multicast-Source Specific Multicast (PIM-SSM) scheme constructed according to a contemporary art.

Turning now to FIGS. 1A-1C, FIG. 1A is a diagram illustrating a transmission of traffic in a network system using a shared-tree scheme of a Protocol Independent Multicast-Sparse Mode (PIM-SM) constructed according to a contemporary art; FIG. 1B is a diagram illustrating a transmission of traffic in a network system using a source-based scheme of a Protocol Independent Multicast-Sparse Mode (PIM-SM) constructed according to a contemporary art; and FIG. 1C is a diagram illustrating a transmission of traffic in a network system using a Protocol Independent Multicast-Source Specific Multicast (PIM-SSM) scheme constructed according to a contemporary art.

As shown in FIG. 1A, when the Protocol Independent Multicast-Sparse Mode (PIM-SM) supports the shared-tree, a central router, that is, a rendezvous point (RP) 13, is used as a root of the shared tree and a first hop router 11 that is directly connected to a multicast source 12 transmits a received multicast traffic to Rendezvous point (RP) 13. Last-Hop Routers 15, 17 are directly connected to multicast receivers 10. Next, Rendezvous point (RP) 13 transfers the multicast traffic to all of multicast receivers 10 that are included in a corresponding multicast group through the shared-tree. For this operation, all of multicast receivers 10 enroll at the Internet Protocol (IP) multicast group information that multicast receivers 10 desires to receive. Therefore, traffic from multicast source 12 comes down to Rendezvous point (RP) 13 through First-Hop Router 11 and Rendezvous point (RP) 13 transmits the traffic to multicast receivers 10 through Last-Hop Routers.

When the Protocol Independent Multicast-Sparse Mode (PIM-SM) supports the source-based tree as shown in FIG. 1B, on the other hand, a source tree exists for each multicast source. A last-hop router 15 that is connected to multicast receiver 10 finds a shortest path heading toward a corresponding multicast source (i.e. multicast source 12 in this case) and multicast source 12 joins a multicast group whereby the multicast traffic is transferred to each multicast receiver via the source tree.

The two schemes described above initially transfer the multicast traffic via the shared-tree and convert to the source tree at the last-hop router when the multicast traffic is transferred to the multicast receiver.

As shown in FIG. 1C, the Protocol Independent Multicast-Source Specific Multicast (PIM-SSM) always uses the source tree, instead of using the shared tree, based on the above-described Protocol Independent Multicast-Sparse Mode (PIM-SM). In the Protocol Independent Multicast-Source Specific Multicast (PIM-SSM) scheme, multicast receivers 10 are aware of information on the multicast source, that is, the multicast server, and information on the multicast group that the multicast receiver desires to join. The multicast receiver operates in such a manner to join the multicast source and multicast group information at the router.

Also, with respect to a particular multicast source and a particular multicast group, the Protocol Independent Multicast-Source Specific Multicast (PIM-SSM) transfers the multicast traffic only to a joined multicast receiver. Specifically, when it is assumed that the multicast source that the receiver desires to join is 'S' and an address of the multicast group is 'G', the receiver joins (S, G), which is referred to as a channel (S, G).

The multicast traffic of the Protocol Independent Multicast-Source Specific Multicast (PIM-SSM) is transferred only through the channel(S, G).

In order for the multicast receiver to join the channel(S, G), Internet Group Management Protocol Version 3 (IGMPv3) must be supported.

Instead of the Protocol Independent Multicast-Source Specific Multicast (PIM-SSM) initially transferring the multicast traffic through the shared-tree and subsequently converting to the source-based tree, multicast receivers 10 are already aware of the multicast source and then joins the channel(S, G). Therefore, the concept of the shared tree is not needed. Unlike FIGS. 1A and 1B, "router 14" in FIG. 1C does not perform function of Rendezvous point (RP), but only transmits a PIM-SM (P,G) Join message. Accordingly, the Protocol Independent Multicast-Source Specific Multicast (PIM-SSM) uses only the source-based tree, that is, the shortest-path tree, without using the shared-tree and the Rendezvous point (RP).

When a multicast receiver joins a channel(S, G) and transmits a 'Join' message to a first router (i.e., a last-hop router) at the first step, and the last-hop router receives a 'Join' message from the multicast receiver and must periodically, for example, at a default time interval of 60 seconds, transmit a Protocol Independent Multicast-Sparse Mode (PIM-SM) Join message(S, G) to a second router (i.e., a first-hop router) heading toward multicast source S at the second. Next, the higher level router receives the Join message(S, G) from the lower level router (i.e., last-hop router) and also periodically transmits the Join message(S, G) to a third router, that is, another higher router 14 heading toward the multicast source S at the third step.

When using the Protocol Independent Multicast-Source Specific Multicast (PIM-SSM), different applications may use different multicast source addresses for multicast group addresses, respectively.

On the other hand, when using the Protocol Independent Multicast-Sparse Mode (PIM-SM), different applications use the same multicast group address. Therefore, the applications may receive undesired multicast traffic.

Figure 2:
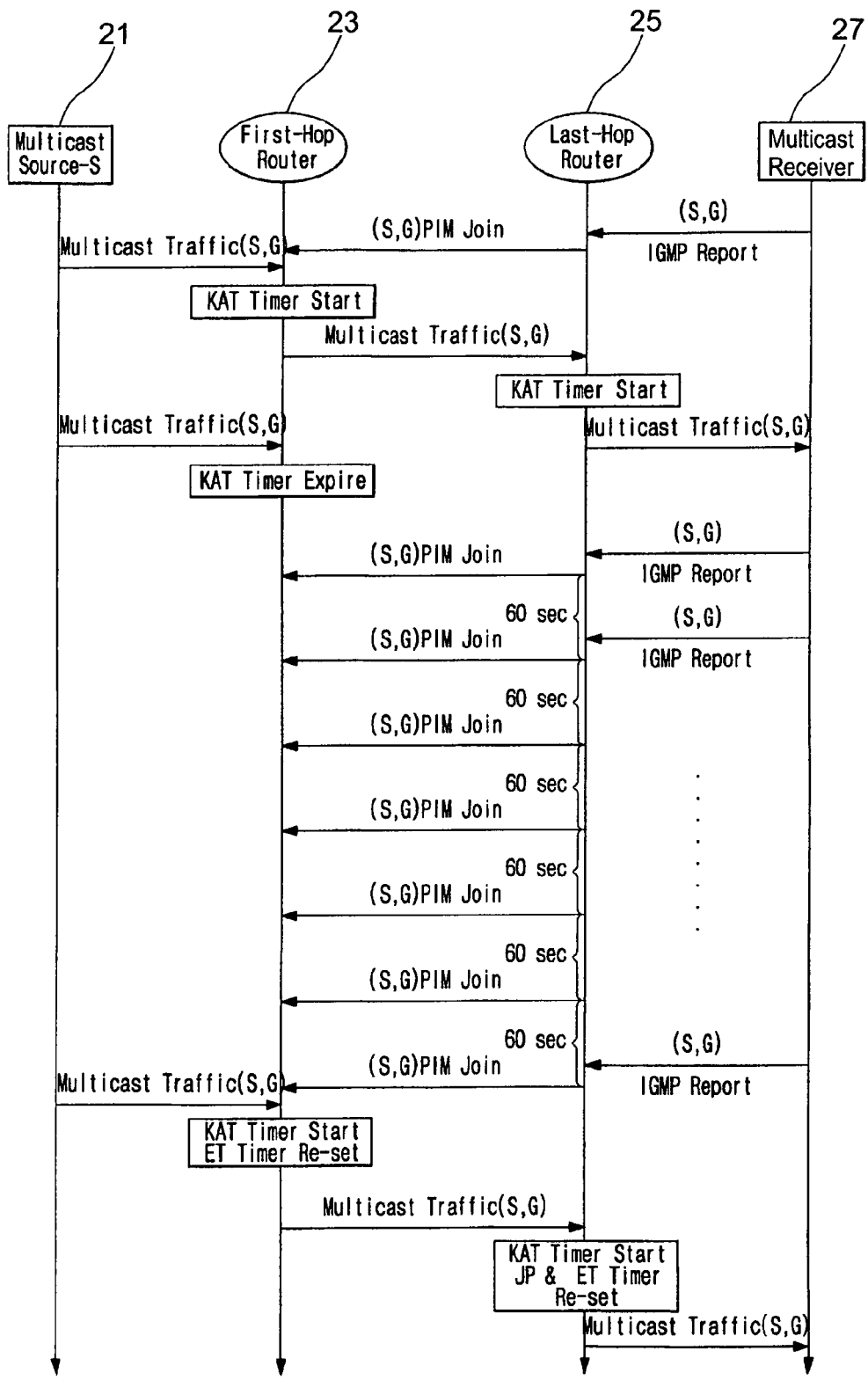
FIG. 2 is a flow diagram illustrating a signal flow in a network system using a Protocol Independent Multicast-Source Specific Multicast (PIM-SSM) scheme constructed according to the co contemporary art.

FIG. 2 is a flow diagram illustrating a signal flow in a network system using a Protocol Independent Multicast-Source Specific Multicast (PIM-SSM) scheme constructed according to the contemporary art.

Hereinafter, an operation of the Protocol Independent Multicast-Source Specific Multicast (PIM-SSM) will be described with reference to FIG. 2.

When a multicast receiver joins a channel(S, G) and transmits a 'Join' message to a first router 25 (i.e., a last-hop router), and the last-hop router receives a 'Join' message from the multicast receiver and must periodically, for example, at a default time interval of 60 seconds, transmit a Protocol Independent Multicast-Sparse Mode (PIM-SM) Join message(S, G) to a second router 23 (i.e., a first-hop router) heading toward a multicast source S.

Next, higher level router 23 (i.e. the first-hop router) receives the Join message(S, G) from lower level router 25 (i.e., last hop router) and also periodically transmits the Join message(S, G) to a third router (not shown on FIG. 2), that is, another higher router heading toward the multicast source S.

Through the above process of joining the channel(S, G), the first, the second, and the third routers in the network may create and maintain the channel(S, G).

In this instance, the third router that is a first-router heading toward multicast source S 21 may receive the multicast traffic from multicast source S 21 and immediately transfer the multicast traffic to lower router 25 through the created channel(S, G).

When the third router receives the multicast traffic(S, G) from multicast source S 21, the third router starts a Keep-Alive Time (KAT) timer. The KAT timer is used to delete the channel(S, G) when the multicast traffic(S, G) is initially received from multicast source S 21 and another multicast traffic(S, G) is not received from the multicast source S during a predetermined period of time.

Even though the multicast traffic(S, G) is not received from multicast source S 21, when a (S, G) Protocol Independent Multicast (PIM) Join message is received from lower hop router 25, the KAT timer does not delete the channel(S, G). Only when the (S, G) Protocol Independent Multicast (PIM) Join message is not received from lower hop router 25, the KAT timer is used to delete the corresponding channel(S, G).

The contemporary Protocol Independent Multicast-Source Specific Multicast (PIM-SSM), however, does not have a function of informing a multicast receiver side whether a multicast source is active or inactive. Therefore, a multicast receiver cannot be aware of whether the multicast source is active or inactive.

Accordingly, even though the channel(S, G) is not active anymore, that is, even though the multicast source S does not transmit the multicast traffic to the multicast group G for a long time period, or even though the multicast source S does not transmit the multicast traffic to the multicast group G anymore, in a state where the multicast receiver joins the channel(S, G), last-hop router 25 must periodically, for example, every 60 seconds, transmit a Join message(S, G) to higher hop router 23. Also, a router connected to multicast source 21 and all the intermediate routers must periodically transmit the Join message(S, G) which makes even an unnecessary packet be transmitted, and thereby causes a heavy traffic load in a network.

Hereinafter, a Join message load control system and method in a network using a Protocol Independent Multicast-Source Specific Multicast (PIM-SSM) constructed according to exemplary embodiments of the present invention will be described with reference to the accompanying drawings. A system configuration to be described later herein is used to readily describe the present invention, and thus it will be apparent to those of ordinary skill in the art that the present invention is not limited thereto.

Figure 3:
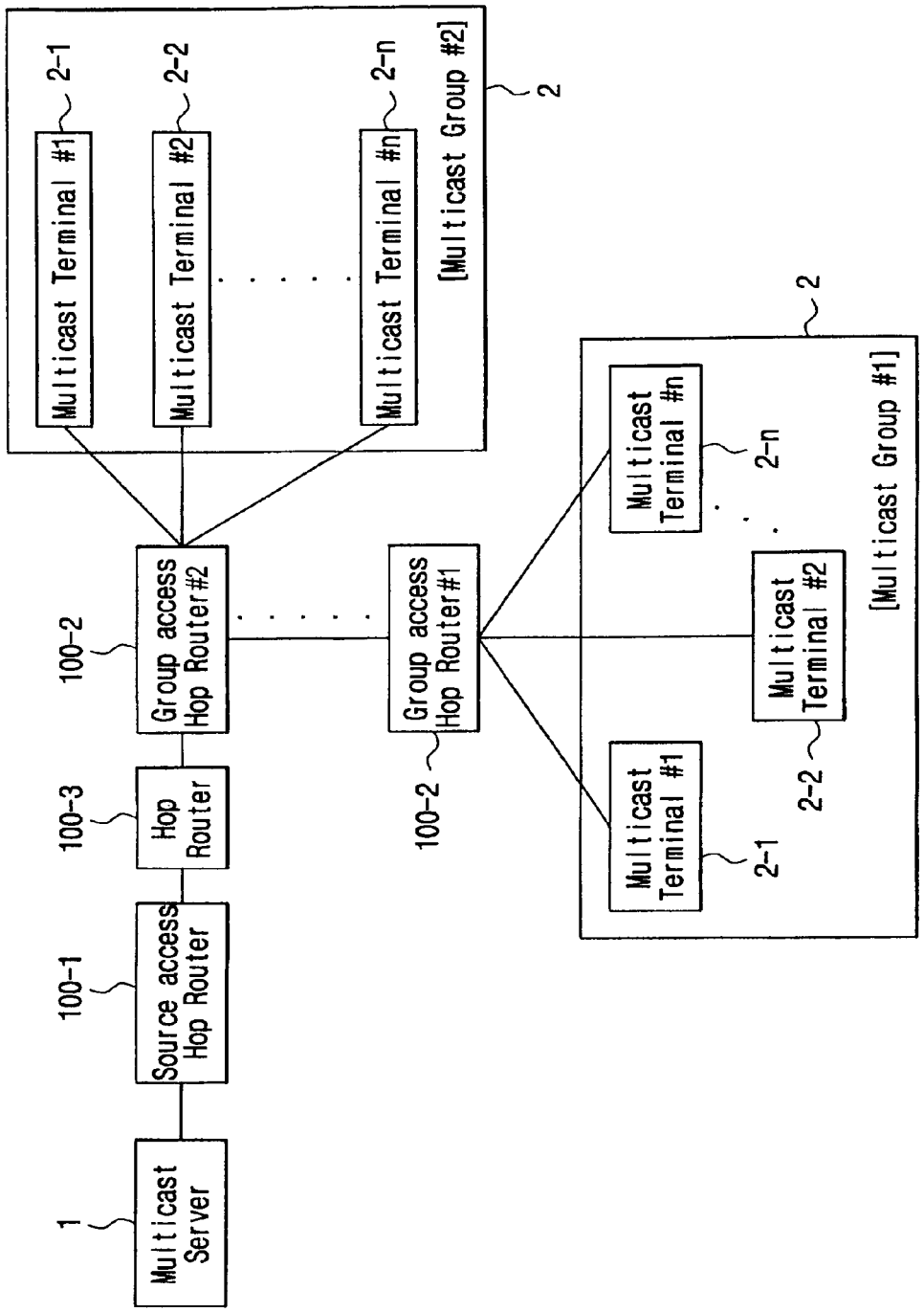
FIG. 3 is a block diagram illustrating a configuration of a Join message load control system in a network using a Protocol Independent Multicast-Source Specific Multicast (PIM-SSM) constructed according to an exemplary embodiment of the present invention.

FIG. 3 is a block diagram illustrating a configuration of a Join message load control system in a network using a Protocol Independent Multicast-Source Specific Multicast (PIM-SSM) constructed according to an exemplary embodiment of the present invention. In the network using the Protocol Independent Multicast-Source Specific Multicast (PIM-SSM), the Join message load control system includes a multicast server 1, at least one hop router (100-1, 100-2, ..., 100-n), and at least one multicast terminal (2-1, 2-2, ..., 2-n).

Figure 4:
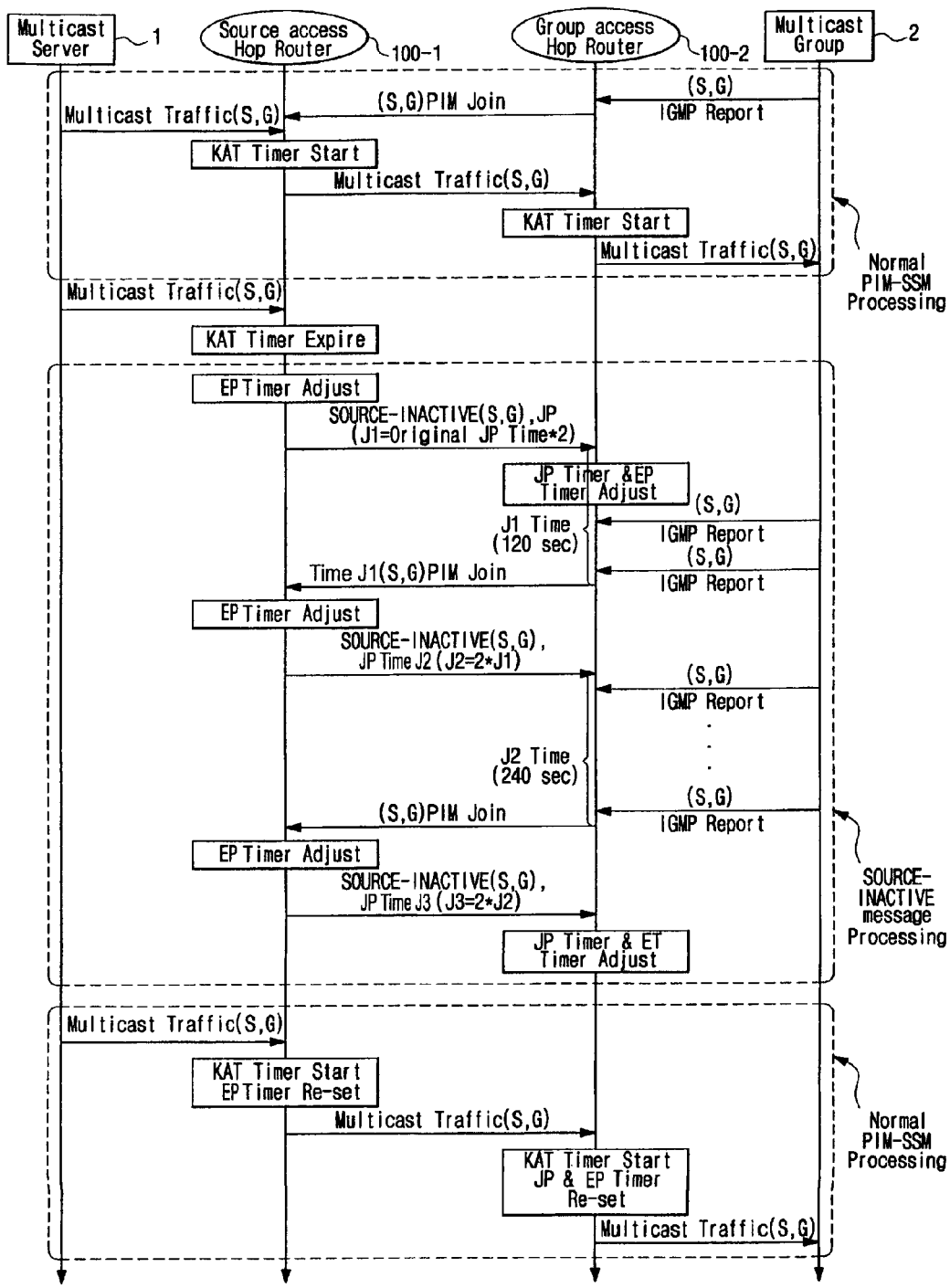
FIG. 4 is a flow diagram illustrating a signal flow of the Join message load control system in the network using the Protocol Independent Multicast-Source Specific Multicast (PIM-SSM) as shown in FIG. 3.

FIG. 4 is a flow diagram illustrating a signal flow of the Join message load control system in the network using the Protocol Independent Multicast-Source Specific Multicast (PIM-SSM) as shown in FIG. 3.

Multicast server 1 includes a source of multicast traffic and transmits the multicast traffic.

Compared to PIM-SSM processing as shown in FIG. 2, in FIG. 4, normal PIM-SSM processing as shown in FIG. 2 is firstly executed; and then a source-inactive message processing constructed according to the embodiment of the present invention is executed; and lastly a normal PIM-SSM processing as shown in FIG. 2 is executed. The source-inactive message processing constructed according to the embodiment of the present invention will be described as follows.

Figure 6A:
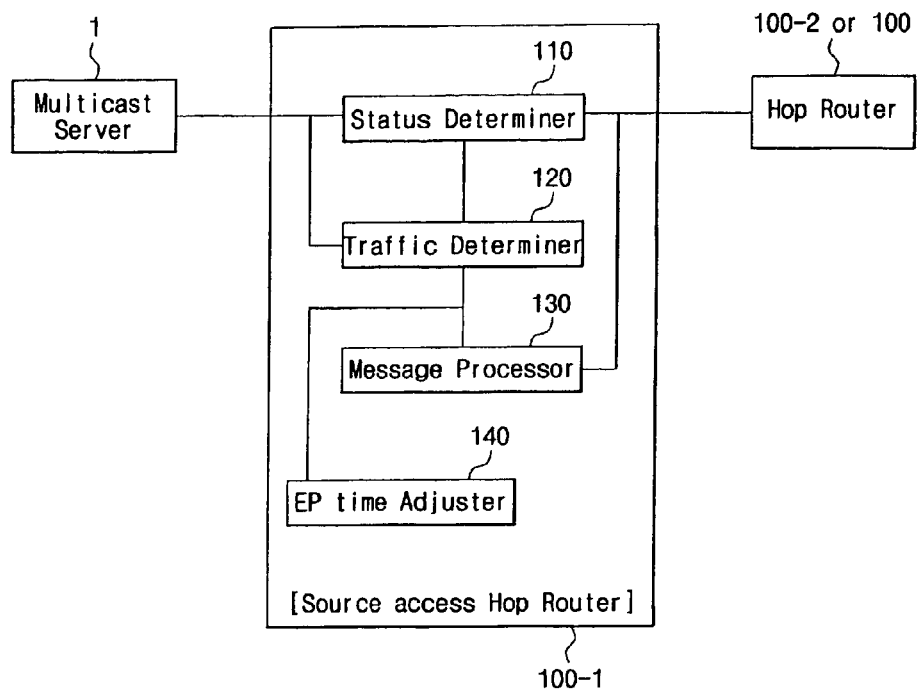
FIG. 6A is a block diagram illustrating a configuration of a source access hop router using a Protocol Independent Multicast-Source Specific Multicast (PIM-SSM) protocol constructed according to an embodiment of the present invention.
Figure 6B:
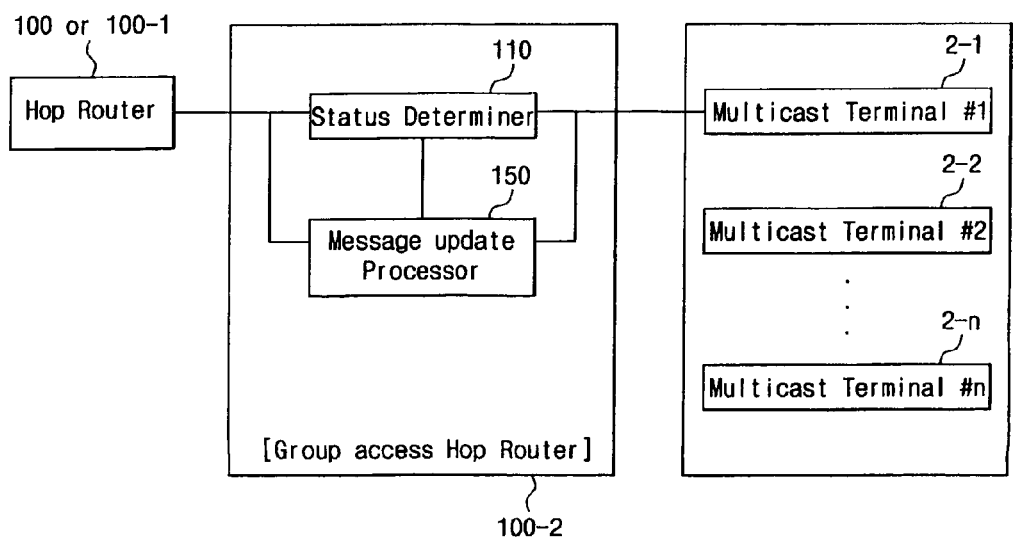
FIG. 6B is a block diagram illustrating a configuration of a group access hop router using a Protocol Independent Multicast-Source Specific Multicast (PIM-SSM) protocol constructed according to an embodiment of the present invention.

When the multicast traffic is not received from multicast server 1 during a set Keep-Alive Time (KAT), source access hop router 100-1 creates a SOURCE-INACTIVE message and transmits the created SOURCE-INACTIVE message to group hop router 100-2. In this instance, the SOURCE-INACTIVE message includes information on an update set time of a PIM Join message. Also, source access hop router 100-1 is a router 100 (as shown in FIGS. 6A and 6B) that is directly connected to multicast server 1.

When the multicast traffic is not received from multicast server 1 and the PIM Join message is not received, source access hop router 100-1 sets an extended play time (EP time) for receipt of the PIM Join message to delete a channel (S, G). Also, source access hop router 100-1 changes the update set time information of the Protocol Independent Multicast (PIM) Join message (i.e., JP Time), and includes the changed update set time information of the Protocol Independent Multicast (PIM) Join message in the SOURCE-INACTIVE message.

Also, source access hop router increases 100-1 increases the update set time of the Protocol Independent Multicast (PIM) Join message, included in the SOURCE-INACTIVE message, to be greater than a currently set update set time of the Protocol Independent Multicast (PIM) Join message. The JP time is increased by 2 times of the currently JP time. For example, JP Time J1 is set as 2 times of the original Internet Protocol (IP) time, JP Time J2 is set as 2 times of the JP time J1, and JP Time J3 is set as 2 times of JP time J2.

Figure 5C:
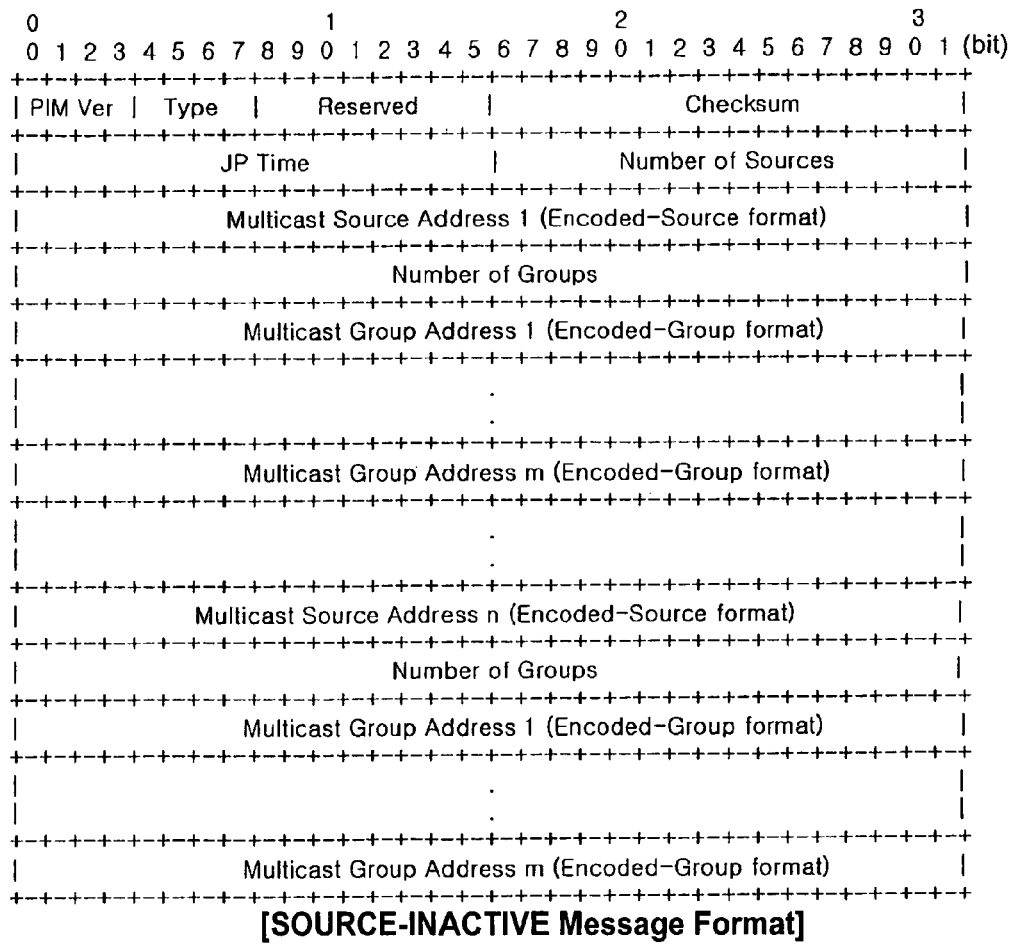
FIG. 5C illustrates a format of a SOURCE-INACTIVE message that is used in the Join message load control system in the network using the Protocol Independent Multicast-Source Specific Multicast (PIM-SSM) as shown in FIG. 3.

FIG. 5A illustrates a header format of a Protocol Independent Multicast-Sparse Mode (PIM-SM) that is used in the Join message load control system in the network using the Protocol Independent Multicast-Source Specific Multicast (PIM-SSM) as shown in FIG. 3; FIG. 5B is a table illustrating a message type of the Protocol Independent Multicast-Sparse Mode (PIM-SM) that is used in the Join message load control system in the network using the Protocol Independent Multicast-Source Specific Multicast (PIM-SSM) as shown in FIG. 3; and FIG. 5C illustrates a format of a SOURCE-INACTIVE message that is used in the Join message load control system in the network using the Protocol Independent Multicast-Source Specific Multicast (PIM-SSM) as shown in FIG. 3.

The SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM), i.e., message types 9-15 not defined as shown in FIG. 5B. The SOURCE-INACTIVE message may include a Protocol Independent Multicast-Sparse Mode (PIM-SM) message header, update set time information of the Protocol Independent Multicast (PIM) Join message, the multicast server address information, and the multicast group address information.

The Protocol Independent Multicast-Sparse Mode (PIM-SM) message header may include a PIM version (PIM ver) section, a type section, a reserved section, and a checksum section, as shown in FIG. 5A. Each section has a predetermined bit length as shown in FIG. 5A.

Also, the message type is shown in FIG. 5B and is used for ninth through fifteenth message types, excluding zero though eighth message types used for Protocol Independent Multicast-Sparse Mode (PIM-SM) and PIM-DM.

As shown in FIG. 5C, the SOURCE-INACTIVE message may further include a plurality of items of inactive multicast server information and a plurality of items of multicast group information. Specifically, a multicast server providing a source may transmit a multicast traffic to one multicast group and may also transmit another multicast traffic to another multicast group using the same hop router.

Also, source access hop router 100-1 initializes the KAT when the multicast traffic is received from the multicast server 1.

When the SOURCE-INACTIVE message is received from the source access hop router 100-1, the group access hop router 100-2 resets the update set time of the Protocol Independent Multicast (PIM) Join message. The group access hop routers are that is directly connected to the at least one multicast terminal (2-1, 2-2, ..., 2-n).

When transmitting a corresponding Protocol Independent Multicast (PIM) Join message to source access hop router 100-1 after receiving an Internet Group Management Protocol (IGMP) report from the at least one multicast terminal (2-1, 2-2, ..., 2-n), group access hop router 100-2 transmits the Protocol Independent Multicast (PIM) Join message to the source access hop router 100-1 at the reset update set time of the Protocol Independent Multicast (PIM) Join message. Also, group access hop router 100-2 initializes the update set time of the Protocol Independent Multicast (PIM) Join message when the multicast traffic is received from source access hop router 100-1.

Figure 5C:
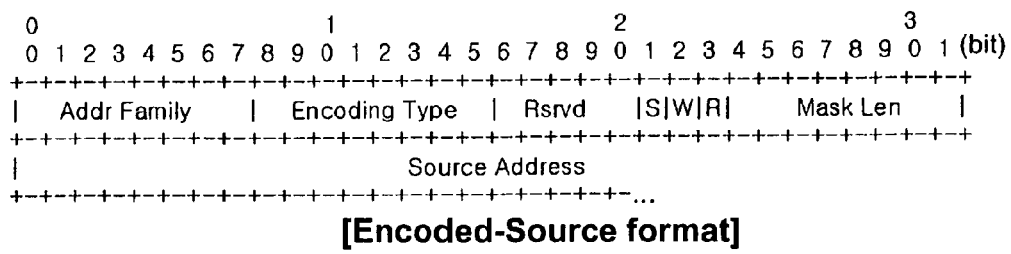
Figure 5C:
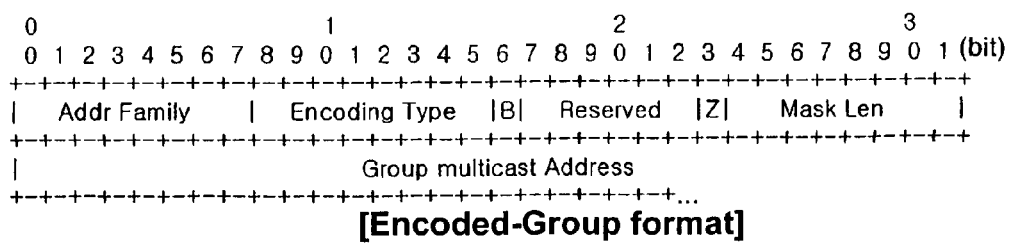

Known functions of each of the components and detailed operations thereof will be omitted. Hereinafter, operations of each of the components constructed according to an exemplary embodiment of the present invention will be described with reference to FIGS. 4 through 5C.

In a network system using the Protocol Independent Multicast-Source Specific Multicast (PIM-SSM), multicast groups 2 generally include multicast terminals (2-1, 2-2, ..., 2-n) and periodically transmit a (S, G)Internet Group Management Protocol (IGMP) report message to a group access hop router 100-2. In this instance, the grouped multicast terminals (2-1, 2-2, . . . , 2-*n*) belong to multicast group 2.

Accordingly, group access hop router 100-2 receives the (S, G)Internet Group Management Protocol (IGMP) report message from the multicast terminals (2-1, 2-2, . . . , 2-*n*) and transmits a (S, G)Protocol Independent Multicast (PIM) Join message to a source access hop router 100-1.

Source access hop router 100-1 creates a channel(S, G) and stores the created channel(S, G).

When a multicast traffic(S, G) is received from multicast server 1, source access hop router 100-1 starts a KAT timer. Generally, the KAT timer is set to 210 seconds based on page 134 of section 4. 11 of document RFC 4601.

Next, when the multicast traffic(S, G) is not received multicast server 1 during the KAT timer, source access hop router 100-1 creates a SOURCE-INACTIVE message. In this instance, source access hop router 100-1 includes update set time information of the Protocol Independent Multicast (PIM) Join message, and sets the update set time information of the Protocol Independent Multicast (PIM) Join message to be twice a currently set update set time of the Protocol Independent Multicast (PIM) message and includes the set update set time information in the SOURCE-INACTIVE message. For example, when the currently set update set time is 60 seconds, source access hop router 100-1 sets the update set time information of the PIM Join message to 120 seconds. In this instance, the SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM). Also, the SOURCE-INACTIVE message may include a Protocol Independent Multicast-Sparse Mode (PIM-SM) message header, update set time information of the PIM Join message, multicast server 1 address information, and address information of a multicast group.

Meanwhile, the SOURCE-INACTIVE message may further include a plurality of items of inactive multicast server information and a plurality of items of multicast group information as shown in FIG. 5C.

Group access hop router 100-2 sets the PIM Join message update set time to the PIM Join message update set time, for example, 120 seconds, that is included in the received the SOURCE-INACTIVE message. In the SOURCE-INACTIVE message, encoded-source format and encoded-group format are also shown in FIG. 5C. Encoded-source format refers to a format which is used when source access hop router encodes and transmits.

Next, even though the (S, G) Internet Group Management Protocol (IGMP) report message is received from the multicast terminals (2-1, 2-2, . . . , 2-*n*), group access hop router 100-2 does not transmit the Protocol Independent Multicast (PIM) Join message to source access hop router 100-1 at the existing update set time of the Protocol Independent Multicast (PIM) Join message, for example, 60 seconds. Instead, group access hop router 100-2 transmits the Protocol Independent Multicast (PIM) Join message to source access hop router 100-1 at the reset update set time of the Protocol Independent Multicast (PIM) Join message, for example, 120 seconds.

Through the above-described operations, source access hop router 100-1 and group access hop router 100-2 increase the update set time of the Protocol Independent Multicast (PIM) Join message, which results in making the (S, G)Join report traffic affect the network less.

Also, when the multicast traffic is not received from multicast server 1, and the Protocol Independent Multicast (PIM) Join message is not received, source access hop router 100-1 sets an EP time for receipt of the PIM Join message to delete the channel(S, G).

In this instance, the EP time for receipt of the PIM Join message is set to "PIM Join message update set time*3.5", i.e., 3.5 times of PIM Join message update set time, based on page 134, section 4. 11 of RFC 4601.

Next, source access hop router 100-1 initializes the KAT when the multicast traffic is received from multicast server 1.

Subsequently, source access hop router 100-1 initializes the update set time of the PIM Join message when the multicast traffic is received from source access hop router 100-1.

FIGS. 6A and 6B are block diagrams illustrating a configuration of a router in a network supporting a Protocol Independent Multicast-Source Specific Multicast (PIM-SSM) constructed according to an exemplary embodiment of the present invention. In the network supporting the Protocol Independent Multicast-Source Specific Multicast (PIM-SSM), the router includes a status determiner 110, a traffic determiner 120, and a message processor 130. The router may further include an EP time adjuster 140 and a message update processor 150.

Status determiner 110 determines whether the router has accessed at least one multicast terminal (2-1, 2-2, . . . , 2-*n*) or multicast server 1.

When it is determined by status determiner 110 that the router has accessed multicast server 1, traffic determiner 120 determines whether a multicast traffic is received from multicast server 1 during a set KAT When the multicast traffic is not received from multicast server 1 during the KAT, message processor 130 resets update set time information of a PIM Join message, includes the reset update set time information of the PIM Join message in a SOURCE-INACTIVE message, and transmits the same to a lower hop router 100. In this instance, message processor 130 increases the update set time of the PIM Join message, included in the SOURCE-INACTIVE message, to be greater than a currently set update set time of the Protocol Independent Multicast (PIM) Join message.

When the multicast traffic is not received from multicast server 1, and the Protocol Independent Multicast (PIM) Join message is not received, EP time adjuster 140 of router 100 adjusts an EP time for receipt of the Protocol Independent Multicast (PIM) Join message to delete a channel(S, G).

The SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM).

Also, the SOURCE-INACTIVE message may include a Protocol Independent Multicast-Sparse Mode (PIM-SM) message header, update set time information of PIM Join message, the multicast server address information, and address information of a multicast group, and may further include a plurality of inactive multicast server information and a plurality of multicast group information.

Router 100 initializes the KAT when the multicast traffic is received from multicast server 1.

When it is determined by status determiner 110 that router 100 has accessed the at least one multicast terminal (2-1, 2-2, . . . , 2-*n*) and the SOURCE-INACTIVE message is received from higher router 100, message update processor 150 resets the update set time of the PIM Join message included in the SOURCE-INACTIVE message.

Message update processor 150 transmits the PIM Join message to higher router 100 at the set update set time of the PIM Join message. When the multicast traffic is received from higher router 100, message update processor 150 initializes the update set time of the PIM Join message.

General functions of each of the components and detailed operations thereof have been described above. Hereinafter, operations of each of the components constructed according to an exemplary embodiment of the present invention will be described.

Status determiner 110 determines whether the router has accessed the at least one multicast terminal (2-1, 2-2, ..., 2-n) or multicast server 1. When the router accesses multicast server 1, the router is a first-hop router 100. When the router accesses the at least one multicast server (2-1, 2-2, ..., 2-n), the router is a last-hop router 100.

When it is determined by status determiner 110 that the router has accessed multicast server 1, traffic determiner 120 determines whether a multicast traffic is received from multicast server 1 during a set KAT.

When the multicast traffic is not received from multicast server 1 during the KAT, message processor 130 resets update set time information of a PIM Join message, includes the reset update set time information of the PIM Join message in a SOURCE-INACTIVE message, and transmits the same to a lower hop router 100. In this instance, message processor 130 may increase update set time information of the PIM Join message, included in the SOURCE-INACTIVE message, to be twice the currently set update set time of the PIM Join message. Also, the SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM). The SOURCE-INACTIVE message may include a Protocol Independent Multicast-Sparse Mode (PIM-SM) message header, update set time information of the PIM Join message, multicast server 1 address information, and address information of a multicast group. Also, the SOURCE-INACTIVE message may further include a plurality of items of inactive multicast server information and a plurality of items of multicast group information.

When the multicast traffic is not received from the multicast server, and the PIM Join message is not received, EP time adjuster 140 adjusts an EP time for receipt of the PIM Join message to delete a channel(S, G).

Conversely, when the multicast traffic is received from multicast server 1, router 100 initializes the KAT.

Also, when it is determined by status determiner 110 that router 100 has accessed the at least one multicast terminal (2-1, 2-2, ..., 2-n) and the SOURCE-INACTIVE message is received from higher router 100, message update processor 150 of router 100 resets the update set time of the PIM Join message included in the received SOURCE-INACTIVE message.

In this instance, message update processor 150 transmits the PIM Join message to higher router 100 at reset update set time of the PIM Join message. Message update processor 150 initializes the update set time of the PIM Join message when the multicast traffic is received from higher router 100.

A Join message control method in a network using a Protocol Independent Multicast-Source Specific Multicast (PIM-SSM) constructed according to an exemplary embodiment of the present invention, as constructed above, will be described with reference to FIG. 7.

In step S1, a router 100 determines whether router 100 has accessed at least one multicast terminal (2-1, 2-2, ..., 2-n) or multicast server 1.

In step S2, when it is determined that router 100 has accessed multicast server 1, that is, when it is YES in step S1, router 100 determines whether a multicast traffic is received from multicast server 1 during a set KAT.

In step S3, when the multicast traffic is not received from multicast server 1 during the KAT, that is, when it is NO in step S2, router 100 resets update set time information of a PIM Join message, includes the reset update set time information of the PIM Join message in a SOURCE-INACTIVE message, and transmits the same to lower hop router 100.

In step S3, an EP time for receipt of the PIM Join message may be set to delete a channel(S, G) when the multicast traffic is not received from multicast server 1, and the PIM Join message is not received. Also, in step S3, the update set time of the PIM Join message, included in the SOURCE-INACTIVE message, may be increased to be greater than a currently set update set time of the PIM Join message.

The SOURCE-INACTIVE message may be added to message types of a Protocol Independent Multicast-Sparse Mode (PIM-SM), and may also be added to any one of ninth through fifteenth message types of the Protocol Independent Multicast-Sparse Mode (PIM-SM).

Also, the SOURCE-INACTIVE message may include a Protocol Independent Multicast-Sparse Mode (PIM-SM) message header, update set time information of the PIM Join message, the multicast server 1 address information, and address information of a multicast group.

Also, the SOURCE-INACTIVE message may further include a plurality of inactive multicast server information and a plurality of multicast group information.

In step S10, a PIM Join message processing scheme at the router 100 initializes the KAT when the multicast traffic is received from the multicast server 1, that is, when it is YES in step S2.

In step S20, when it is determined that router 100 has accessed the at least one multicast terminal (2-1, 2-2, ... 2-n) in step S1, router 100 resets the update set time of the PIM Join message, based on the SOURCE-INACTIVE message that is received from a higher router. Also, in step S20, router 100 may transmit the PIM Join message to the higher router at the reset update set time of the PIM Join message.

The PIM Join message processing scheme at router 100 initializes the update set time of the PIM Join message when the multicast traffic is received from the higher router.

A Join message load control system and method in a network using a Protocol Independent Multicast-Source Specific Multicast (PIM-SSM) constructed according to the present invention may adjust a JP timer of a Join(S, G) message depending on whether a channel(S, G) is active or inactive. Therefore, it is possible to reduce the periodical transmission of unnecessary Join(S, G) messages and thereby reduce traffic load in a network.

Although exemplary embodiments of the present invention have been shown and described, the present invention is not limited to the described exemplary embodiments. Instead, it will be appreciated by those skilled in the art that changes may be made to the exemplary embodiments herein without departing from the principles and spirit of the invention, the scope of which is defined by the following claims and their equivalents.

What is claimed is:

1. A Join message load control system in a network system that comprises at least one multicast terminal, a multicast server, and at least one router, and uses a Protocol Independent Multicast-Source Specific Multicast (PIM-SSM) protocol, the Join message load control system comprising:

a source access hop router creating a SOURCE-INACTIVE message and transmitting the created SOURCE-INACTIVE message when a multicast traffic is not received from the multicast server during a set Keep-Alive Time (KAT), and said SOURCE-INACTIVE message including information on an update set time of a PIM Join message; and a group access hop router resetting the update set time of the PIM Join message when the SOURCE-INACTIVE message is received from the source access hop router.

2. The system of claim 1, with the source access hop router being a router that is directly connected to the multicast server.

3. The system of claim 1, with the group access hop router being a router that is directly connected to the at least one multicast terminal.

4. The system of claim 2, in which the source access hop router sets an extended play time (EP time) for receipt of the PIM Join message to delete a channel(S, G), when the multicast traffic is not received from the multicast server, and the PIM Join message is not received.

5. The system of claim 4, in which the source access hop router changes the update set time information of the PIM Join message and includes the changed update set time information of the PIM Join message in the SOURCE-INACTIVE message, when the multicast traffic is not received from the multicast server.

6. The system of claim 2, in which the source access hop router increases the update set time of the PIM Join message, included in the SOURCE-INACTIVE message, to be greater than a currently set update set time of the PIM Join message.

7. The system of claim 2, with the SOURCE-INACTIVE message being added to message types of a Protocol Independent Multicast-Sparse Mode (PIM-SM).

8. The system of claim 7, with the SOURCE-INACTIVE message being added to any one of ninth through fifteenth message types of the Protocol Independent Multicast-Sparse Mode (PIM-SM).

9. The system of claim 7, in which the SOURCE-INACTIVE message comprises a Protocol Independent Multicast-Sparse Mode (PIM-SM) message header, update set time information of the PIM Join message, the multicast server address information, and the multicast group address information.

10. The system of claim 9, in which the SOURCE-INACTIVE message further comprises a plurality of items of inactive multicast server information and a plurality of items of multicast group information.

11. The system of claim 4, in which the source access hop router initializes the KAT when the multicast traffic is received from the multicast server.

12. The system of claim 3, in which when transmitting a corresponding PIM Join message to the source access hop router after receiving an Internet Group Management Protocol (IGMP) report from the at least one multicast terminal, the group access hop router transmits the PIM Join message to the source access hop router at the reset update set time of the PIM Join message.

13. The system of claim 12, in which the group access hop router initializes the update set time of the PIM Join message, when the multicast traffic is received from the source access hop router.

14. A router that accesses either at least one multicast terminal or a multicast server and uses a Protocol Independent Multicast-Source Specific Multicast (PIM-SSM) protocol, the router comprising:

a status determiner determining whether the router has accessed the either at least one multicast terminal or the multicast server;

a traffic determiner determining whether a multicast traffic is received from the multicast server during a set Keep-Alive Time (KAT), when it is determined by the status determiner that the router has accessed the multicast server; and a message processor resetting update set time information of a PIM Join message, including the reset update set time information of the PIM Join message in a SOURCE-INACTIVE message, and transmitting the same to a lower hop router, when the multicast traffic is not received from the multicast server during the KAT.

15. The router of claim 14, further comprising an extended play (EP) time adjuster to set an EP time for receipt of the PIM Join message to delete a channel(S, G) when the multicast traffic is not received from the multicast server and the PIM Join message is not received.

16. The router of claim 14, in which the message processor increases the update set time of the PIM Join message, included in the SOURCE-INACTIVE message, to be greater than a currently set update set time of the PIM Join message.

17. The router of claim 14, with the SOURCE-INACTIVE message being added to message types of a Protocol Independent Multicast-Sparse Mode (PIM-SM).

18. The router of claim 17, with the SOURCE-INACTIVE message being added to any one of ninth through fifteenth message types of the Protocol Independent Multicast-Sparse Mode (PIM-SM).

19. The router of claim 17, in which the SOURCE-INACTIVE message includes a Protocol Independent Multicast-Sparse Mode (PIM-SM) message header, update set time information of the PIM Join message, the multicast server address information, and the multicast group address information.

20. The router of claim 19, in which the SOURCE-INACTIVE message further includes a plurality of items of inactive multicast server information and a plurality of items of multicast group information.

21. The router of claim 14, in which the router initializes the KAT when the multicast traffic is received from the multicast server.

22. The router of claim 14, further comprising a message update processor resetting the update set time of the PIM Join message, included in the SOURCE-INACTIVE message, when it is determined by the status determiner that the router has accessed the at least one multicast terminal and the SOURCE-INACTIVE message is received from a higher router.

23. The router of claim 22, in which the message update processor transmits the PIM Join message to the higher router at the set update set time of the PIM Join message.

24. The router of claim 23, in which the message update processor initializes the update set time of the PIM Join message, when the multicast traffic is received from the higher router.

25. A join message load control method in a network where a router accesses at least one multicast terminal or a multicast server, and that uses a Protocol Independent Multicast-Source Specific Multicast (PIM-SSM), the Join message load control method comprising the steps of:

determining, by the router, whether the router has accessed the at least one multicast terminal or the multicast server;

determining, by the router, whether a multicast traffic is received from the multicast server during a set Keep-Alive Time (KAT), when it is determined that the router has accessed the multicast server; and resetting update set time information of a PIM Join message, including the reset update set time information of the PIM Join message in a SOURCE-INACTIVE message, and transmitting the same to a lower hop router when the multicast traffic is not received from the multicast server during the KAT.

26. The method of claim 25, in which the transmitting step further comprises the step of setting an extended play (EP) time for receipt of the PIM Join message to delete a channel (S, G), when the multicast traffic is not received from the multicast server and the PIM Join message is not received.

27. The method of claim 25, in which the transmitting increases the update set time of the PIM Join message, included in the SOURCE-INACTIVE message, to be greater than a currently set update set time of the PIM Join message.

28. The method of claim 25, in which the SOURCE-INACTIVE message is added to message types of a Protocol Independent Multicast-Sparse Mode (PIM-SM).

29. The method of claim 28, in which the SOURCE-INACTIVE message is added to any one of ninth through fifteenth message types of the Protocol Independent Multicast-Sparse Mode (PIM-SM).

30. The method of claim 29, in which the SOURCE-INACTIVE message includes a Protocol Independent Multicast-Sparse Mode (PIM-SM) message header, update set time information of the PIM Join message, the multicast server address information, and the multicast group address information.

31. The method of claim 25, in which the SOURCE-INACTIVE message further includes a plurality of inactive multicast server information and a plurality of multicast group information.

32. The method of claim 25, in which a PIM Join message processing scheme at the router initializes the KAT, when the multicast traffic is received from the multicast server.

33. The method of claim 25, further comprising the step of resetting, by the router, the update set time of the PIM Join message, based on the SOURCE-INACTIVE message when it is determined that the router has accessed the at least one multicast terminal, wherein the SOURCE-INACTIVE message is received from a higher router.

34. The method of claim 33, in which the resetting of the update set time transmits the PIM Join message to the higher router at the reset update set time of the PIM Join message.

35. The method of claim 33, in which a PIM Join message processing scheme at the router initializes the update set time of the PIM Join message when the multicast traffic is received from the higher router.

36. A network system, comprising:
a multicast server providing and transmitting a broadcast traffic in the network system using a Protocol Independent Multicast-Source Specific Multicast (PIM-SSM) protocol;
at least one multicast terminal receiving the broadcast traffic from the multicast server;
at least one router being an intermediate router arranged between the multicast server and the at least one multicast terminal;
a Join message load control system, said Join message load control system comprising:
a source access hop router to create a SOURCE-INACTIVE message and transmit the created SOURCE-INACTIVE message when a multicast traffic is not received from the multicast server during a set Keep-Alive Time (KAT), and said SOURCE-INACTIVE message including information on an update set time of a PIM Join message; and
a group access hop router to reset the update set time of the PIM Join message when the SOURCE-INACTIVE message is received from the source access hop router.

* * * * *